(12) United States Patent
Sato

(10) Patent No.: US 11,188,107 B2
(45) Date of Patent: Nov. 30, 2021

(54) IN-VEHICLE POWER CONTROL SYSTEM

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Shinichiro Sato, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 16/640,112

(22) PCT Filed: Aug. 10, 2018

(86) PCT No.: PCT/JP2018/030080
§ 371 (c)(1),
(2) Date: Feb. 19, 2020

(87) PCT Pub. No.: WO2019/044461
PCT Pub. Date: Mar. 7, 2019

(65) Prior Publication Data
US 2021/0132645 A1 May 6, 2021

(30) Foreign Application Priority Data

Aug. 31, 2017 (JP) .............................. JP2017-166639

(51) Int. Cl.
*B60R 16/03* (2006.01)
*G05F 1/577* (2006.01)
(Continued)

(52) U.S. Cl.
CPC .............. *G05F 1/577* (2013.01); *B60R 16/03* (2013.01); *B60R 16/04* (2013.01); *H02J 1/102* (2013.01);
(Continued)

(58) Field of Classification Search
CPC .......... H02J 9/002; H02J 1/06; H02J 2310/46; H02J 2310/60; H02J 2310/52; H02J 2310/50; H02J 2310/48; B60R 16/03
See application file for complete search history.

(56) References Cited

U.S. PATENT DOCUMENTS 5,561,363 A * 10/1996 Mashino ............... H02J 7/1438
322/25
5,845,221 A * 12/1998 Hosokawa .......... B60R 16/0315
701/36

(Continued)

FOREIGN PATENT DOCUMENTS

| JP | 2000-326805 | 11/2000 |
|---|---|---|
| JP | 2005-086968 | 3/2005 |

(Continued)

OTHER PUBLICATIONS

International Search Report, Application No. PCT/JP2018/030080, dated Oct. 23, 2018. ISA/Japan Patent Office.

*Primary Examiner* — Harry R Behm
(74) *Attorney, Agent, or Firm* — Honigman LLP

(57) ABSTRACT

An in-vehicle power control system includes a first load control unit and a power control device. In the power control device, switch units respectively switch the second conductive paths between an electrically connected state and a not-electrically connected state. A second load control unit predetermines types of switch units, and, if the second load control unit has received, from the first load control unit, a power reduction instruction in which a control method is designated by type, controls the switch units for each type (Continued)

thereof based on the control methods designated by type by the power reduction instruction.

4 Claims, 5 Drawing Sheets

(51) Int. Cl.
*B60R 16/04* (2006.01)
*H02J 1/10* (2006.01)
*H02J 9/00* (2006.01)
*H02M 3/157* (2006.01)
*H02J 1/06* (2006.01)

(52) U.S. Cl.
CPC ............ *H02J 9/002* (2013.01); *H02M 3/157* (2013.01); *H02J 1/06* (2013.01); *H02J 2310/40* (2020.01); *H02J 2310/52* (2020.01)

(56) References Cited

U.S. PATENT DOCUMENTS

| | | | | |
|---|---|---|---|---|
| 5,941,966 | A | * | 8/1999 | Gotze ................... G06F 13/387 710/105 |
| 2004/0113494 | A1 | * | 6/2004 | Karuppana ............... H02J 1/14 307/10.8 |
| 2004/0164616 | A1 | * | 8/2004 | Obayashi .............. B60W 10/26 307/18 |

FOREIGN PATENT DOCUMENTS

| | | |
|---|---|---|
| JP | 2006-205867 | 8/2006 |
| JP | 2006-304515 | 11/2006 |
| JP | 2011-130540 | 6/2011 |

* cited by examiner

FIG. 4

| LV 3 Load | Duty 100% |
|---|---|
| LV 2 Load | Duty 50% |
| LV 1 Load | Duty 20% |

FIG. 5

| LV 3 Load | Load A, Load B、Load C ··· |
|---|---|
| LV 2 Load | Load E, Load F、Load G ··· | ← Load Z (new)
| LV 1 Load | Load H, Load J、Load K ··· |

| | | |
|---|---|---|
| LV 3 Load | Duty | 100% |
| LV 2 Load | Duty | 100% |
| LV 1 Load | Duty | 20% |

(B)

| | |
|---|---|
| LV 3 Load | Supply power |
| LV 2 Load | Supply power |
| LV 1 Load | Stop power |

IN-VEHICLE POWER CONTROL SYSTEM

CROSS-REFERENCE TO RELATED APPLICATIONS

This application is the U.S. national stage of PCT/JP2018/030080 filed on Aug. 10, 2018, which claims priority of Japanese Patent Application No. JP 2017-166639 filed on Aug. 31, 2017, the contents of which are incorporated herein.

TECHNICAL FIELD

The present disclosure relates to an in-vehicle power control system.

BACKGROUND

JP 2006-304515A discloses a power supply system for reducing energy consumed by an electrical load. The power supply system disclosed in JP 2006-304515A includes a power source voltage detection means for detecting a voltage value of a power source line to which the power supply source is connected, a semiconductor switch that is connected to an electrical load to which power is to be supplied and can be subjected to PWM control, and a control means for performing PWM control of a switch element connected to the load and controlling an effective power to be supplied to the load. This power supply system sets a duty ratio lower than 1 and performs PWM control of the semiconductor switch connected to the electrical load to reduce power to be supplied to the load, in a state where the power source voltage value is higher than the minimum voltage value.

The technique disclosed in JP 2006-304515A is problematic in that, when power consumed by loads needs to be reduced, semiconductor switches of all paths through which power is to be reduced are subjected to PWM control with a duty (a reduced duty) calculated using a predetermined arithmetic expression, and thus power is uniformly reduced without considering the individual circumstances of the loads. Power to be supplied to a more important load for which a reduction in power is undesirable will be reduced to the same degree as power to be supplied to a less important load that will not cause a problem even if power is temporarily reduced, for example.

The present disclosure was made to resolve at least one of the above-described issues, and an object thereof is to provide a configuration capable of changing a reduction method for each type of load if power consumed by loads needs to be reduced.

SUMMARY

An example according to the present disclosure is an in-vehicle power control system for controlling the supply of power from a first conductive path that is electrically connected to an in-vehicle power source unit to a plurality of loads. The in-vehicle power control system includes: a first load control unit configured to transmit a power reduction instruction when a predetermined condition is satisfied; and a power control device that includes a plurality of second conductive paths, which are conductive paths branched from the first conductive path, a plurality of switch units that are respectively provided in the plurality of second conductive paths. A second load control unit is configured to control the plurality of switch units based on the power reduction instruction received from the first load control unit, in which the second conductive paths are configured as power supply paths for supplying power to corresponding loads that respectively correspond to the second conductive paths. The switch units are each configured to switch the second conductive paths between an electrically connected state and a not-electrically connected state, the first load control unit is configured to, if the predetermined condition has been satisfied, transmit the power reduction instruction in which a control method is designated by type, and the second load control unit is configured to predetermine types of switch units, and, if the second load control unit has received, from the first load control unit, the power reduction instruction in which a control method is designated by type, control the plurality of switch units for each type of switch unit based on the control methods designated by type.

An example according to the present disclosure is an in-vehicle power control system for controlling the supply of power from a first conductive path that is electrically connected to an in-vehicle power source unit to a plurality of loads. The in-vehicle power control system includes: a first load control unit configured to transmit a power reduction instruction when a predetermined condition is satisfied; and a power control device that includes a plurality of second conductive paths, which are conductive paths branched from the first conductive path, a plurality of switch units that are respectively provided in the plurality of second conductive paths. A second load control unit is configured to control the plurality of switch units based on the power reduction instruction received from the first load control unit, in which the second conductive paths are configured as power supply paths for supplying power to corresponding loads that respectively correspond to the second conductive paths. The switch units are each configured to switch the second conductive paths between an electrically connected state and a not-electrically connected state, the first load control unit is configured to, if the predetermined condition has been satisfied, transmit the power reduction instruction in which a duty is designated by type, and the second load control unit is configured to predetermine types of switch units, and, if the second load control unit has received, from the first load control unit, the power reduction instruction in which a duty is designated by type, perform PWM control of the plurality of switch units for each type of switch unit based on the duties designated by type by the power reduction instruction.

Advantageous Effects of Disclosure

A power control device includes a plurality of second conductive paths, a plurality of switch units that are respectively provided in the plurality of second conductive paths, and a second load control unit configured to control the plurality of switch units. Also, if the second load control unit has received, from the first load control unit, a power reduction instruction in which a control method is designated by type, the second load control unit controls the plurality of switch units for each type of switch unit based on the control methods designated by type. Such a configuration makes it possible to change the reduction method for each type of load in a case where power consumed by loads needs to be reduced.

Furthermore, because the power control device is configured such that the second load control unit configured to control the plurality of switch units is configured separately from the first load control unit configured to transmit the power control instruction and the plurality of switches can be controlled for each type thereof, if the design of the power control system is changed to add a new load and a power supply path (a second conductive path) for supplying power to the new load, the design of the power control system can be easily changed through a simple design change in which complication of a control performed by the first load control unit side is inhibited and the second load control unit side is to be mainly changed.

BRIEF DESCRIPTION OF DRAWINGS

FIG. 4 is a diagram illustrating an example of a power reduction instruction in which a duty is designated by type.

FIG. 5 is a diagram illustrating a design change for newly adding a load.

FIG. 7 is a diagram illustrating another example of a power reduction instruction.

DETAILED DESCRIPTION OF PREFERRED EMBODIMENTS

Here, desirable examples of the disclosure will be described.

If the second load control unit has received, from the first load control unit, a power reduction instruction in which a duty is designated by type, the second load control unit may operate to perform PWM control of the plurality of switch units for each type thereof based on the duties designated by type by the power reduction instruction.

Accordingly, it is possible to perform PWM control of the switch units for each type thereof based on the duties designated by type if power consumed by a load needs to be reduced, and thus it is possible to perform finer power control by type.

If the in-vehicle power source unit is in at least either a predetermined charge amount decrease state or a predetermined deterioration state, the first load control unit may operate to transmit, to the second load control unit, the power reduction instruction in which a control method is designated by type.

Accordingly, even if the charge amount of the in-vehicle power source unit has decreased or the in-vehicle power source unit is in a deterioration state, it is possible to reduce the total power consumed by a plurality of loads and make it unlikely that a power related problem will occur, and to reduce load power by using a method with which a reduction method may be changed for each type of load.

A generator may be electrically connected to the first conductive path. If the generator is in a predetermined output decrease state, the first load control unit may operate to transmit, to the second load control unit, the power reduction instruction in which a control method is designated by type.

Accordingly, even if the output of the generator has decreased, it is possible to reduce the total power consumed by a plurality of loads and make it unlikely that a power related problem will occur, and to reduce load power by using a method with which a reduction method may be changed for each type of load.

If power consumption of a plurality of loads is in a predetermined excessive state, the first load control unit may operate to transmit, to the second load control unit, the power reduction instruction in which a control method is designated by type.

Accordingly, if power consumption of a plurality of loads is excessive, it is possible to reduce the total power consumed by the plurality of loads and make it unlikely that a power related problem will occur, and to reduce load power by using a method with which a reduction method may be changed for each type of load.

Embodiment 1

Hereinafter, Embodiment 1 embodying the present disclosure will be described.

Figure 1:
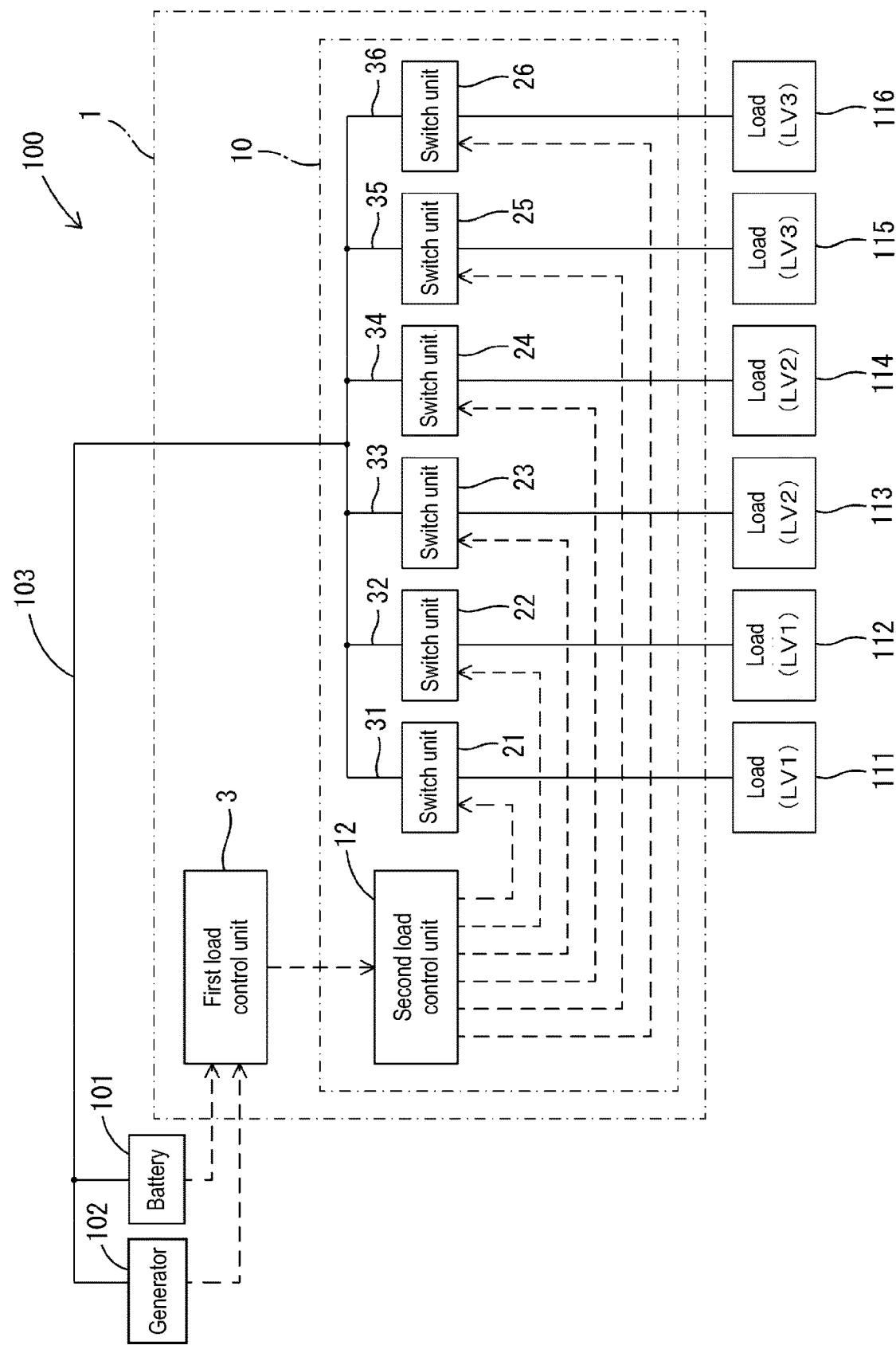
FIG. 1 is a block diagram schematically showing an on-board system including an in-vehicle power supply system according to Embodiment 1.

An on-board system 100 shown in FIG. 1 includes a battery 101, a generator 102, a first conductive path 103, a power control system 1, and the like, and is constituted as a system for supplying power to a plurality of loads. The power control system 1 corresponds to an example of an in-vehicle power control system, and operates to control the supply of power from the first conductive path 103 that is electrically connected to the battery 101 to a plurality of loads 111, 112, 113, 114, 115, and 116.

The battery 101 corresponds to an example of the in-vehicle power source unit and functions as a main power source for supplying power to various targets. The battery 101 is configured as a known in-vehicle power storage unit such as a lead battery, for example, and a high-potential terminal is electrically connected to the first conductive path 103, and applies a predetermined output voltage to the first conductive path 103. Note that a fuse, an ignition switch, and the like are not shown in FIG. 1.

The generator 102 is configured as a known in-vehicle generator such as an alternator, is configured to perform a power generation operation during the operation of an engine, and output a predetermined voltage (power generation voltage). The operation and output voltage (power generation voltage) of the generator 102 are controlled by an electronic control device (not shown).

The plurality of loads 111, 112, 113, 114, 115, and 116 are configured as known in-vehicle loads, and the loads correspond to known in-vehicle loads such as a steering system, a braking system, an air conditioner, a power window, an audio system, a navigation system, and a seat heater.

The power control system 1 is constituted mainly by a first load control unit 3 and a power control device 10. The first load control unit 3 and the power control device 10 may be configured as separate units, or may be configured as a single unit. The following describes an example in which the first load control unit 3 and the power control device 10 are configured as separate units.

The first load control unit 3 is configured as an in-vehicle electronic control device, for example, and is a device for controlling power supplied to a load. The first load control unit 3 is configured as a unit separate from the power control device 10, for example, and is configured to be capable of transmitting information to the power control device 10 via one or more wire units (not shown) and to be capable of receiving information from the power control device 10. The first load control unit 3 includes at least one or more control circuits such as a microcomputer, and functions to transmit a power reduction instruction when a predetermined condition is satisfied. Note that the operation of the first load control unit 3 will be described later.

The power control device 10 corresponds to an example of the in-vehicle power control device, and operates to control the supply of power to the plurality of loads based on an instruction received from the first load control unit 3. The power control device 10 a plurality of second conductive paths 31, 32, 33, 34, 35, and 36, which are conductive paths branched from the first conductive path 103, a plurality of switch units 21, 22, 23, 24, 25, and 26 that are respectively provided in the plurality of second conductive paths 31, 32, 33, 34, 35, and 36, a second load control unit 12 controlling the plurality of switch units 21, 22, 23, 24, 25, and 26 based on a power reduction instruction received from the first load control unit 3.

The plurality of second conductive paths 31, 32, 33, 34, 35, and 36 are all configured to be electrically connected to the first conductive path 103, and to be branched from the first conductive path 103, and are configured as power supply paths for respectively supplying power to the corresponding loads. In the example shown in FIG. 1, the second conductive path 31 is configured as a power supply path for supplying power to the load 111, the second conductive path 32 is configured as a power supply path for supplying power to the load 112, the second conductive path 33 is configured as a power supply path for supplying power to the load 113, the second conductive path 34 is configured as a power supply path for supplying power to the load 114, the second conductive path 35 is configured as a power supply path for supplying power to the load 115, and the second conductive path 36 is configured as a power supply path for supplying power to the load 116. Although an example in which one corresponding load is provided in each of the second conductive paths 31, 32, 33, 34, 35, and 36 is shown in FIG. 1, one or more corresponding loads may be provided.

The plurality of switch units 21, 22, 23, 24, 25, and 26 are configured to switch the plurality of second conductive paths 31, 32, 33, 34, 35, and 36 between the electrically connected state and the not-electrically connected state. The plurality of switch units 21, 22, 23, 24, 25, and 26 are individually controlled by the second load control unit 12, and switch the states of the corresponding second conductive paths to the electrically connected state while receiving an electrical connection instruction from the second load control unit 12, and switch the states of the corresponding second conductive paths to the not-electrically connected state while receiving a non-electrical connection instruction. The plurality of switch units 21, 22, 23, 24, 25, and 26 may be each configured as a semiconductor switch such as a FET (Field effect transistor), or may be each configured as a DCDC converter provided with such a semiconductor switch. The following describes an example in which the plurality of switch units 21, 22, 23, 24, 25, and 26 are each configured as a semiconductor switch. In the example shown in FIG. 1, when the switch unit 21 is in the ON state, the second conductive path 31 is in the electrically connected state and power is supplied to the corresponding load (the load 111) that corresponds to the second conductive path 31, and when the switch unit 21 is in the OFF state, the second conductive path 31 is in the not-electrically connected state (an electrically disconnected state) and the supply of power to the corresponding load (the load 111) that corresponds to the second conductive path 31 is disconnected. Similarly, when the switch unit 22 is in the ON state, the second conductive path 32 is in the electrically connected state and power is supplied to the corresponding load (the load 112) that corresponds to the second conductive path 32, and when the switch unit 22 is in the OFF state, the second conductive path 32 is in the not-electrically connected state (an electrically disconnected state) and the supply of power to the corresponding load (the load 112) that corresponds to the second conductive path 32 is disconnected. The other switch units 23, 24, 25, and 26 also operate in the same manner as the switch units 21 and 22. Note that "the corresponding loads corresponding to the second conductive paths" refer to load that may receive the supply of power via the second conductive paths, and the number of loads may be one or more. Although the corresponding load that corresponds to the second conductive path 31 is a load that may receive the supply of power via the second conductive path 31 and only one load 111 is shown in FIG. 1, for example, a load other than the load 111 may be provided in a manner in which the load may receive the supply of power via the second conductive path 31.

Figures 2, 3:
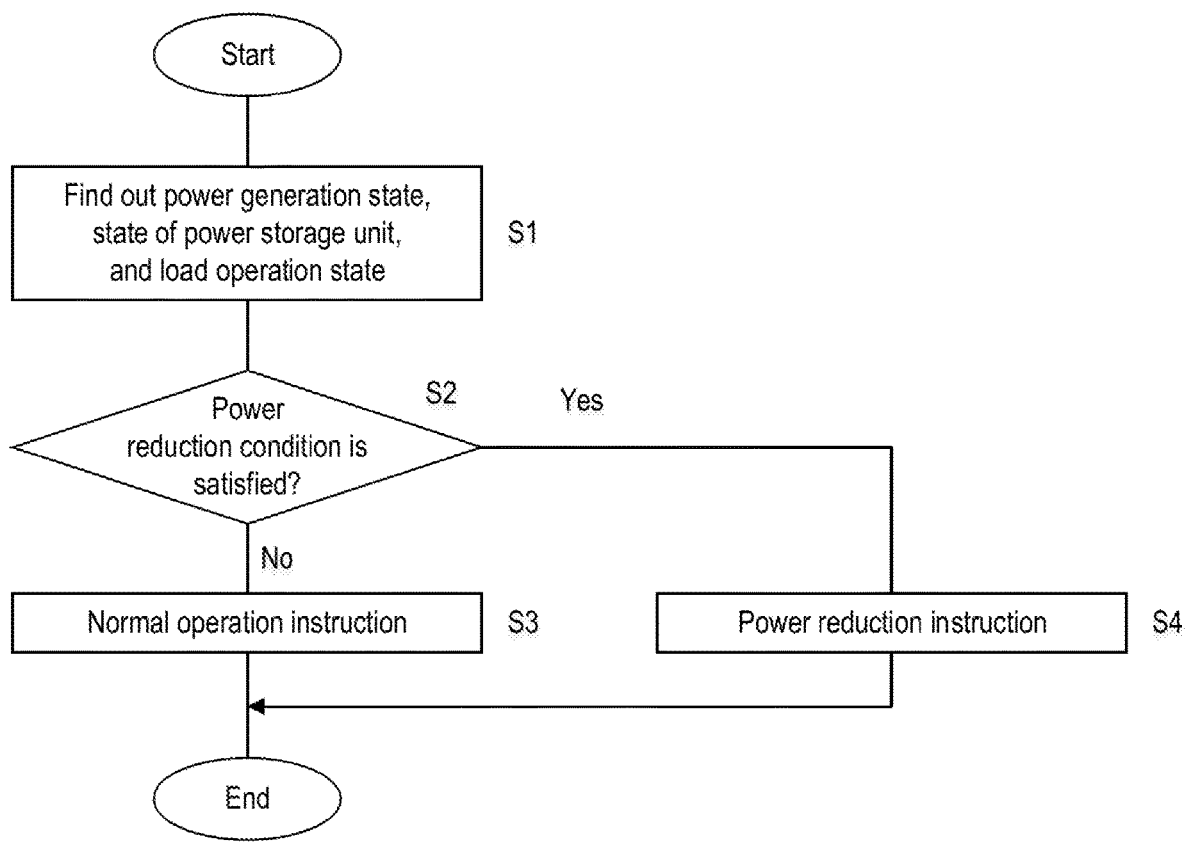
FIG. 2 is a diagram illustrating an example in which a plurality of loads are classified into types.
FIG. 3 is a flowchart showing the flow of power control executed in a first load control unit.

The second load control unit 12 is configured as a control circuit provided with a microcomputer and the like, for example, and includes a control unit such as a CPU and storage units such as a ROM and a RAM. As shown in FIG. 2, the second load control unit 12 predetermines types of loads at three levels. In the example shown in FIG. 1, the second load control unit 12 defines the loads 111 and 112 as a type-one (level 1) load, defines the loads 113 and 114 as a type-two (level 2) load, and defines the loads 115 and 116 as a type-three (level 3) load, for example. Note that information in which the types of loads are defined in this manner (information for specifying which load corresponds to which type) can be stored in advance in a storage unit such as a ROM, for example. In the example shown in FIGS. 1 and 2, the type-three (level 3) load is positioned as the most important load having the highest importance, and a load whose operation needs to be maintained while the vehicle is traveling (e.g., a load that cannot properly move or stop the vehicle if the operation thereof stops, such as a steering system or a braking system) is the type-three (level 3) load. The type-two (level 2) load is positioned as a load having a medium importance, the importance thereof being lower than that of the type-three (level 3) load and higher than the type-one (level 1) load, and a load whose operation is desired to be somewhat maintained while the vehicle is traveling (e.g., a load that is likely to cause the user to feel uncomfortable if the operation thereof stops while the vehicle is traveling, such as an air conditioner, a power window, and an audio system) is the type-two (level 2) load. The type-one (level 1) load is positioned as a load having little importance, the importance thereof being lower than that of the type-two (level 2) load, and a load that will not cause a problem even if the operation thereof stops or is inhibited while the vehicle is traveling (a load that is unlikely to cause the user to feel uncomfortable even if the operation thereof stops while the vehicle is traveling, such as a seat heater) is the type one (level 1) load.

The second load control unit 12 defines the switch units 21 and 22 that correspond to the type-one (level 1) loads 111 and 112 as type-one (level 1) switch units, defines the switch units 23 and 24 that correspond to the type-two (level 2) loads 113 and 114 as the type-two (level 2) switch units, and defines the switch units 25 and 26 that correspond to the type-three (level 3) loads 115 and 116 as type-three (level 3) switch units. Note that information in which the types of switch units are defined in this manner (information for specifying which switch unit corresponds to which type) can be stored in advance in a storage unit such as a ROM, for example.

Next, the operation of the power control system 1 will be described.

If a predetermined start condition is satisfied (e.g., if a vehicle activation switch (such as an ignition switch) is switched from the OFF state to the ON state), the first load control unit 3 performs power control processing shown in FIG. 3, and repeats the power control processing shown in FIG. 3 until a predetermined end condition is satisfied (e.g., until the vehicle activation switch (such as the ignition switch) is switched from the OFF state to the ON state.

If the first load control unit 3 has started the power control processing shown in FIG. 3, the first load control unit 3 first finds out the power generation state of the generator 102, the state of the battery 101 (the state of the generator, such as the SOC and SOH), the load operation state, and the like (step S1).

The first load control unit 3 finds out the power generation state as a result of determining whether or not the voltage output from the generator 102 (power generation voltage) is a predetermined threshold (a voltage determination threshold) or more. The first load control unit 3 finds out the state of the generator as a result of detecting the SOC (State Of Charge) of the battery 101 using a known method. The first load control unit 3 also finds out the state of the generator as a result of detecting the SOH (State Of Health) of the battery 101 using a known method. The first load control unit 3 detects or acquires, using a known method, from an external device, the total power consumed by the entire vehicle (the total power consumed by a plurality of loads that receive power supplied from the first conductive path 103), and finds out the load operation state as a result of determining whether the total power consumed by the plurality of loads that receive power supplied from the first conductive path 103 is a predetermined threshold (a load operation state determination threshold) or less. Note that the SOH of the battery 101 may be detected every time the control shown in FIG. 3 is executed, or may be detected in the power control processing (FIG. 3) that is first performed after the vehicle activation switch (e.g., the ignition switch) is switched from the OFF state to the ON state, and the SOH detected at this time may be repeatedly used as the SOH detected in step S1 until the activation switch (e.g., the ignition switch) is next switched to the OFF state.

After step S1, the first load control unit 3 determines whether or not a power reduction condition is satisfied (step S2). Specifically, the first load control unit 3 determines that the power reduction condition is satisfied, in a case corresponding to at least any one of the case where it is determined that the voltage output from the generator 102 (power generation voltage) that is acquired in step S1 is less than the predetermined threshold (the voltage determination threshold), the case where it is determined that the SOC of the battery 101 acquired in step S1 is less than a predetermined SOC threshold, the case where it is determined that the SOH of the battery 101 acquired in step S1 is less than a predetermined SOH threshold, and the case where it is determined that the total power consumed by a plurality of loads that is acquired in step S1 (the total power consumed by a plurality of loads that receive power supplied from the first conductive path 103) exceeds a predetermined load operation state determination threshold, and in this case, the first load control unit 3 transmits the power reduction instruction to the second load control unit 12 (step S4). On the other hand, if, in step S2, the first load control unit 3 does not determine that the power reduction condition is satisfied, the first load control unit 3 transmits a predetermined normal operation instruction to the second load control unit 12 (step S3).

In this configuration, the case where the SOC of the battery 101 is less than the predetermined SOC threshold corresponds to an example of a predetermined charge amount decrease state. The case where the SOH of the battery 101 is less than the predetermined SOH threshold corresponds to an example of a predetermined deterioration state. The case where the voltage output from the generator 102 (power generation voltage) is less than a predetermined threshold (a voltage determination threshold) corresponds to an example of a predetermined output decrease state. The case where the total power consumed by a plurality of loads that receive power supplied from the first conductive path 103 exceeds the load operation state determination threshold corresponds to an example of a predetermined excessive state. Also, in a case corresponding to at least any of the case where the battery 101 (the in-vehicle power source unit) is in at least either a predetermined charge amount decrease state or a predetermined deterioration state, the case where the generator 102 is in a predetermined output decrease state, and the case where power consumption of a plurality of loads is in a predetermined excessive state, the first load control unit 3 operates to transmit, to the second load control unit 12, the power reduction instruction in which a control method is designated by type.

If the second load control unit 12 has received the normal operation instruction from the first load control unit 3, the second load control unit 12 continues the ON states of the plurality of switch units 21, 22, 23, 24, 25, and 26. That is, the second load control unit 12 turns on all of the switch units 21, 22, 23, 24, 25, and 26 with the duty of 100%.

If the first load control unit 3 has determined that the power reduction condition is satisfied, the first load control unit 3 transmits the power reduction instruction to the second load control unit 12, and transmits the power reduction instruction as instruction information in which a control method is designated by type. Specifically, if processing of step S4 is executed, as shown in FIG. 4, the first load control unit 3 transmits, to the second load control unit 12, the power reduction instruction in which a duty is designated by type. FIG. 4 shows an example of a power reduction instruction in which the duty of 100% is designated to the type-three (level 3) load, the duty of 50% is designated to the type-two (level 2) load, and the duty of 20% is designated to the type-one (level 1) load.

On the other hand, if the second load control unit 12 has received, from the first load control unit 3, the power reduction instruction in which a control method is designated by type, the second load control unit 12 controls the plurality of switch units for each type thereof based on the control methods designated by type. As described above, the second load control unit 12 has predetermined the types of switch units 21, 22, 23, 24, 25, and 26 in correspondence with the types of loads 111, 112, 113, 114, 115, and 116, and if the second load control unit 12 has received, from the first load control unit 3, an instruction (a power reduction instruction in which a duty is designated by type) as shown in FIG. 4, the second load control unit 12 operates to perform PWM control of the switch units 21, 22, 23, 24, 25, and 26 for each type thereof based on the duties designated by type. If the second load control unit 12 has received the power reduction instruction as shown in FIG. 4, for example, the second load control unit 12 drives the type-three (level 3) switch units 25 and 26 corresponding to the type-three (level 3) loads 115 and 116 with the duty of 100% (that is, continues the ON states of the switch units 25 and 26), provides the type-two (level 2) switch units 23 and 24 corresponding to the type-two (level 2) loads 113 and 114 with a PWM signal with the duty of 50% and performs PWM control with the duty of 50%, and provides the type-one (level 1) switch units 21 and 22 corresponding to the type-one (level 1) loads 111 and 112 with a PWM signal with the duty of 20% and performs PWM control with the duty of 20%.

Next, exemplary effects of this configuration will be described.

The power control device 10 includes a plurality of second conductive paths 31, 32, 33, 34, 35, and 36, a plurality of switch units 21, 22, 23, 24, 25, and 26 that are respectively provided in the plurality of second conductive paths 31, 32, 33, 34, 35, and 36, and a second load control unit 12 for controlling the plurality of switch units 21, 22, 23, 24, 25, and 26. Also, if the second load control unit 12 has received, from the first load control unit 3, the power reduction instruction in which a control method is designated by type, the second load control unit 12 controls the plurality of switch units 21, 22, 23, 24, 25, and 26 for each type thereof based on the control methods designated by type. Because the second load control unit 12 is configured in this manner, if power consumed by loads needs to be reduced, it is possible to change a reduction method for each type of load.

Also, the power control device 10 is configured such that the second load control unit 12 for controlling the plurality of switch units 21, 22, 23, 24, 25, and 26 is configured separately from the first load control unit 3 for transmitting a power control instruction, and the plurality of switch units 21, 22, 23, 24, 25, and 26 can be controlled for each type thereof, and thus, as shown in FIG. 5, for example, if the design of the power control system is changed to add a new load (a load Z in the example shown in FIG. 5) and a power supply path (the second conductive path) for supplying power to the new load, the design of the power control system can be easily changed through a simple design change in which complication of the control performed by the first load control unit side is inhibited and the second load control unit side is to be mainly changed. In the example shown in FIG. 5, as a result of the load Z being added as the type-two (level 2) load and adding, to the second load control unit 12, information indicating that the corresponding switch unit is the type-two (level 2) switch unit, for example, the design can be easily changed such that the load Z may be controlled as the type-two (level 2) load.

If the second load control unit 12 has received, from the first load control unit 3, the power reduction instruction in which a duty is designated by type, the second load control unit 12 operates to perform PWM control of the plurality of switch units 21, 22, 23, 24, 25, and 26 for each type thereof based on the duties designated by type. Accordingly, if power consumed by loads needs to be reduced, it is possible to perform PWM control of the plurality of switch units 21, 22, 23, 24, 25, and 26 with the duty designated by type, and thus to perform finer power control by type.

If the in-vehicle power source unit (the battery 101) is in at least either a predetermined charge amount decrease state or a predetermined deterioration state, the first load control unit 3 operates to transmit, to the second load control unit 12, the power reduction instruction in which a control method is designated by type. Accordingly, even if the charge amount of the in-vehicle power source unit (the battery 101) decreases, or the in-vehicle power source unit (the battery 101) is in a deterioration state, it is possible to reduce the total power consumed by a plurality of loads to make it unlikely that a power related problem will occur, and to reduce load power by using a method with which a reduction method may be changed for each type of load.

If the generator 102 is in the predetermined output decrease state, the first load control unit 3 operates to transmit, to the second load control unit 12, the power reduction instruction in which a control method is designated by type. Accordingly, even if the output of the generator 102 decreases, it is possible to reduce the total power consumed by a plurality of loads to make it unlikely that a power related problem will occur, and to reduce load power by using a method with which a reduction method may be changed for each type of load.

If power consumption of a plurality of loads is in the predetermined excessive state, the first load control unit 3 operates to transmit, to the second load control unit 12, the power reduction instruction in which a control method is designated by type. Accordingly, even if the power consumption of the plurality of loads is in the excessive state, it is possible to reduce the total power consumed by the plurality of loads to make it unlikely that a power related problem will occur, and to reduce load power by using a method with which a reduction method may be changed for each type of load.

Other Embodiments

The present disclosure is not limited to the embodiment described above using the foregoing description and drawings, and embodiments such as the following are also encompassed in the technical scope of the present disclosure. Also, the above-described embodiments and embodiments, which will be described below, can be combined in various ways as long as no contradiction arises therein.

Although the example in which the plurality of switch units are configured as semiconductor switches has been described in Embodiment 1, any one of the switch units or all switch units may be configured as voltage conversion circuits (e.g., DCDC converters for applying an output voltage to a load side by increasing or reducing a voltage applied to the first conductive path 103) that include semiconductor switches.

Figure 6:
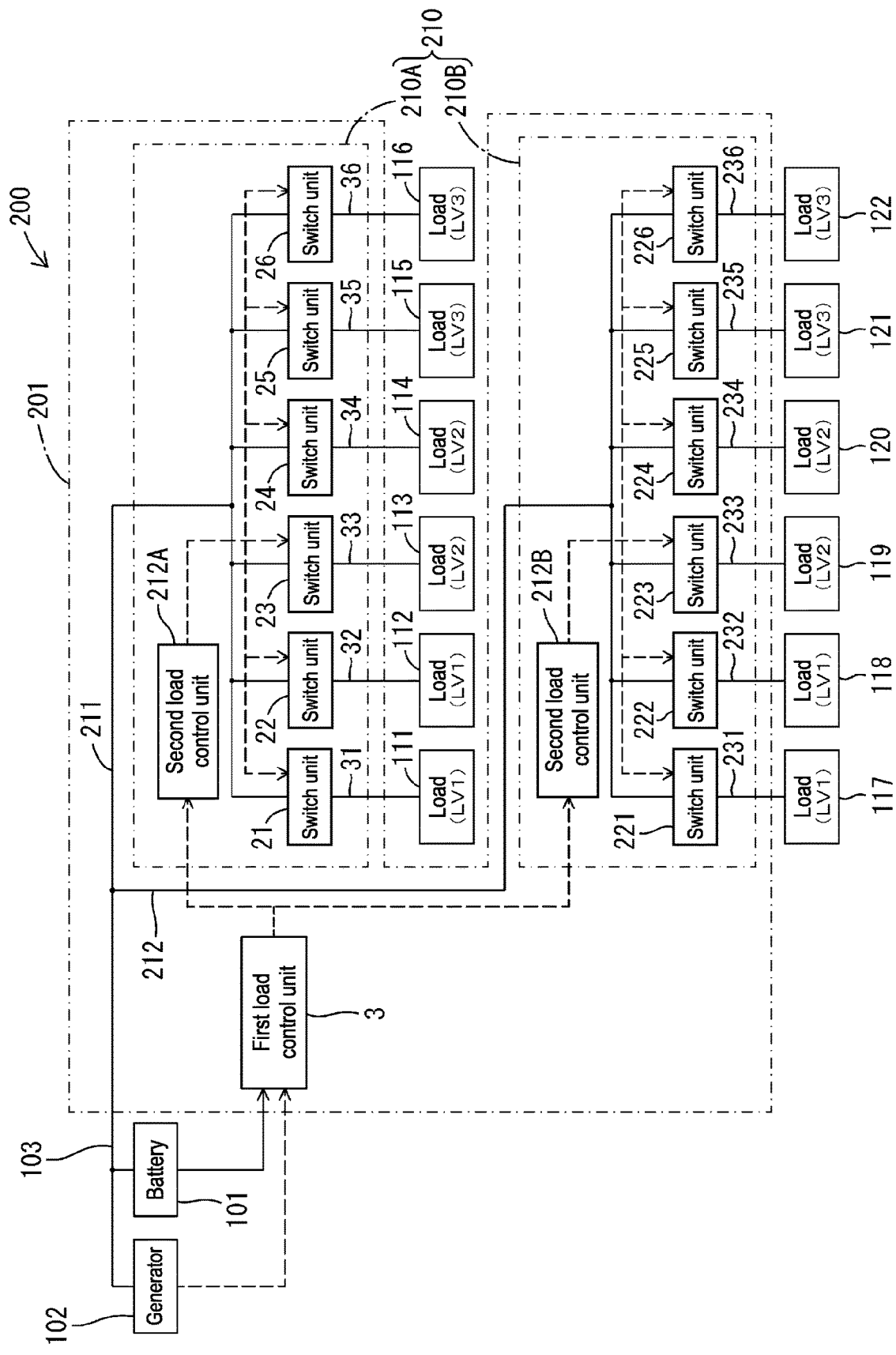
FIG. 6 is a block diagram schematically illustrating a power control system according to another embodiment.

Although the example in which the power reduction instruction is transmitted from the first load control unit 3 to one second load control unit 12 has been described in Embodiment 1, as the on-board system 200 shown in FIG. 6, a configuration may be adopted in which the power reduction instruction is transmitted to a plurality of second load control units 212A and 212B. In FIG. 6, a first power control unit 210A has the same configuration as the power control device 10 of Embodiment 1, and a second power control unit 210B having the same configuration as this first power control unit 210A is further provided. Also, the power control device 210 is constituted by the first power control unit 210A and second power control unit 210B. The on-board system 200 disclosed in FIG. 6 has the same configuration as the on-board system 100 of Embodiment 1, except for the power control device 210. A power control system 201 has the same configuration as the power control system 1 of Embodiment 1, except for the power control device 210. Note that, in the on-board system 200 shown in FIG. 6, portions having the same configuration as the on-board system 100 shown in FIG. 1 are given the same reference numerals as the corresponding portions of the on-board system 100, and will not be described in detail. In the example shown in FIG. 6, in the first power control unit 210A, a plurality of second conductive paths 31, 32, 33, 34, 35, and 36 are electrically connected to a first conductive path 103 via a conductive path 211. The second load control unit 212A has the same configuration as the second load control unit 12 of Embodiment 1, and operates in the same manner. The second power control unit 210B has the same configuration as the first power control unit 210A, and operates in the same manner. In the second power control unit 210B, second conductive paths 231, 232, 233, 234, 235, and 236 are electrically connected to the first conductive path 103 via the conductive path 212, and are configured as power supply paths for supplying power to the corresponding loads (loads 117, 118, 119, 120, 121, and 122). The switch units 221, 222, 223, 224, 225, and 226 switch the second conductive paths 231, 232, 233, 234, 235, and 236 between the electrically connected state and the not-electrically connected state. The second load control unit 212B has predetermined the types of switch units 221, 222, 223, 224, 225, and 226, and if the second load control unit 212B has received, from the first load control unit 3, the power reduction instruction in which a control method is designated by type, the second load control unit 212B controls the switch units 221, 222, 223, 224, 225, and 226 for each type thereof based on the control method designated by type by the power reduction instruction. The power reduction instruction transmitted by the first load control unit 3 may include the content that is the same as that of Embodiment 1 (see FIG. 4), for example, and a method for controlling the switch units 221, 222, 223, 224, 225, and 226 by the second load control unit 212B may be the same control method as the control method used by the second load control unit 12 (FIG. 1) in Embodiment 1, and may be the same control method as the control method used by the second load control unit 212A shown in FIG. 6. Note that although the example in which two power control units (the first power control unit 210A and the second power control unit 210B) are provided is shown in FIG. 6, three or more power control units that are similar thereto may be provided. That is, three or more second load control units that receive a power reduction instruction from the first load control unit 3 may be provided.

Although an example of the power reduction instruction as shown in FIG. 4 has been described in Embodiment 1, the power reduction instruction is not limited to the example as shown in FIG. 4, and, as shown in FIG. 7(A), methods for reducing power for a plurality of types (levels) may be the same in Embodiment 1 or any of the examples obtained by changing Embodiment 1. Also, the power reduction instruction transmitted from the first load control unit 3 does not always have to be a uniform power reduction instruction, and operations may be possible to transmit a power reduction instruction as shown in FIG. 4 under a given condition and transmit a power reduction instruction as shown in FIG. 7(A) under another condition. Also, in Embodiment 1 or any of the examples obtained by changing Embodiment 1, the power reduction instruction transmitted from the first load control unit 3 is not limited to an instruction relating to PWM control, and as shown in FIG. 7(B), the power reduction instruction may be an instruction such that a switch unit of any type is turned ON (power supplied state) and a switch unit of another type is turned OFF (power stopped state). In this case, it is sufficient that the second load control unit (the second load control unit 12 shown in FIG. 1, or the second load control units 212A and 212B shown in FIG. 6) control the ON and OFF states of the plurality of switch units to turn ON the switch units of types according to which the supply of power is instructed (the type-two and type-three in the example shown in FIG. 7(B)), and turn OFF the switch units of a type according to which stopping of power is instructed (the type-one in the example shown in FIG. 7(B)).

In Embodiment 1 or any of the examples obtained by changing Embodiment 1, the SOH and SOC of the battery 101 can be detected using a known detection method disclosed in JP 2009-214766A, JP 2009-214604A, JP 2007-93358A, JP 2009-226996A, JP 2009-190690A, and the like, and may also be detected using a known method other than the methods disclosed therein. Also, whether the battery 101 is in a "predetermined deterioration state" may be determined using any of the deterioration determination methods disclosed in JP 2011-17546A, JP 2007-30649A, JP 2007-30650A, JP 2008-235155A, and the like, and if it is determined that the battery 101 has deteriorated, it may be determined that the battery 101 is in a "predetermined deterioration state". Of course, a known deterioration determination method other than these methods may be used, and if it is determined that the battery 101 has deteriorated, then it may be determined that the battery 101 is in a "predetermined deterioration state". Also, a case where a voltage output from the battery 101 is less than a predetermined threshold voltage may be determined as a "predetermined charge amount decrease state". Also, in Embodiment 1 or any of the examples obtained by changing Embodiment 1, a configuration may be adopted in which the voltage output from the generator 102 (power generation voltage) is detected using a known method, and a case where the state in which the voltage output from the generator 102 (power generation voltage) is less than a predetermined threshold (a voltage determination threshold) has continued for a certain period of time is determined as a "predetermined output decrease state". In Embodiment 1 or any of the examples obtained by changing Embodiment 1, the "total power consumed by a plurality of loads that receive the supply of power from the first conductive path 103" may be obtained by calculating, as a power value supplied via the first conductive path 103, a value that is based on a voltage value V of the voltage applied to the first conductive path 103 and a current value I of an electric current flowing through the first conductive path 103 (e.g., V×I). Also, a case where the calculated power value exceeds a predetermined threshold (a load operation state determination threshold) may be determined as a "predetermined excessive state". Also, power supplied via the first conductive path 103 may be detected using a known other method.

The invention claimed is:

1. An in-vehicle power control system for use in a vehicle, the in-vehicle power control system for controlling the supply of power from a first conductive path that is electrically connected to an in-vehicle power source unit to a plurality of loads, the in-vehicle power source unit including a generator and a battery, the in-vehicle power control system comprising:

a first load control unit configured to determine a voltage output from the generator, a total power consumed by the plurality of loads, and a predetermined condition, the predetermined condition being any one of the following conditions: (1) the voltage output from the generator is less than a predetermined threshold; (2) a state of charge of the battery is less than a predetermined state of charge threshold; (3) wherein a state of health of the battery is less than a predetermined state of health; and (4) the total power consumed by the plurality of loads exceeds a load operation threshold, wherein the first load control unit transmits a power reduction instruction when the predetermined condition is satisfied; and a power control device that includes a plurality of second conductive paths connected in parallel with each other, which are conductive paths branched from the first conductive path, a plurality of switch units, each one of the plurality of switches are respectively provided in a respective one of the plurality of second conductive paths and interposed between the in-vehicle power source unit and a respective one of the plurality of loads, and a second load control unit configured to control the plurality of switch units based on the power reduction instruction received from the first load control unit, wherein the second conductive paths are configured as power supply paths for supplying power to corresponding loads that respectively correspond to the second conductive paths, the switch units are each configured to switch the second conductive paths between an electrically connected state and a not-electrically connected state, the first load control unit is configured to, if the predetermined condition has been satisfied, transmit the power reduction instruction in which a control method is designated by a plurality of predetermined types, each one of the plurality of predetermined types corresponding to an importance of a respective load in the plurality of loads for the operation of the vehicle while traveling, wherein the power reduction instruction reduces power supplied by the battery based on the plurality of predetermined types, and the second load control unit is configured to define each of the plurality of switch units as a corresponding one of the plurality of predetermined types and individually actuate the predetermined types of switch units, and, if the second load control unit has received, from the first load control unit, the power reduction instruction in which a control method is designated by the predetermined type, control the plurality of switch units for each predetermined type of switch unit based on the control methods designated by the predetermined type by the power reduction instruction so as to selectively turn on or off the plurality of switches.

2. The in-vehicle power control system according to claim 1, wherein the second load control unit has a storage unit for storing information in which the types of switch units are determined.

3. The in-vehicle power control system according to claim 2, wherein the first load control unit and the power control device are configured as separate units.

4. The in-vehicle power control system according to claim 1, wherein the power reduction instruction includes a duty corresponding to one of the plurality of predetermined types.

* * * * *